United States Patent

[11] 3,539,130

[72] Inventors Alfred Winkler and
 Heinz Ernst, Munich, Germany
[21] Appl. No. 727,612
[22] Filed May 8, 1968
[45] Patented Nov. 10, 1970
[73] Assignee Agfa-Gevaert Aktiengesellschaft,
 Leverkusen, Germany
[32] Priority May 12, 1967
[33] Germany
[31] A 55,705

[54] MAGAZINE FOR ROLL FILM
 14 Claims, 3 Drawing Figs.
[52] U.S. Cl. .................................................. 242/194,
 242/55.19
[51] Int. Cl. ..................................................... G03b 1/04;
 G11b 15/32
[50] Field of Search ........................................... 242/181-
 —209, 55.19; 179/100.2

[56] References Cited
UNITED STATES PATENTS
3,107,279 10/1963 Hanes et al. .................. 179/100.2
3,161,361 12/1964 Iida ............................. 242/55.12

Primary Examiner—Leonard D. Christian
Attorney—Michael S. Striker

ABSTRACT: A magazine for roll film wherein a housing accommodates two coaxial reels one of which collects film when the other pays out the film or vice versa. The housing accommodates a device which prevents spillage of film and which comprises two clamps each straddling the outer side and the two side faces of convoluted film on one of the reels and a ring or lever which moves one of the clamps toward the axis of the respective reel when the other clamp is moved by film away from the axis of the respective reel, or vice versa.

INVENTOR.
ALFRED WINKLER
HEINZ ERNST

BY *Michael S. Striker*

Attorney

INVENTOR.
ALFRED WINKLER
HEINZ ERNST 3,539,130

MAGAZINE FOR ROLL FILM

BACKGROUND OF THE INVENTION

The present invention relates to magazines or cassettes for roll film, particularly to magazines for 8-millimeter motion picture film wherein the takeup reel is coaxial with the supply reel. Still more particularly, the invention relates to a magazine which is provided with a novel device serving to prevent spillage (i.e., uncontrolled unwinding) of film in the housing.

It is already known to store motion picture film in a magazine wherein a housing accommodates two coaxial reels each of which is connected to one end portion of film. Initially, the film is convoluted mainly on the supply reel and is drawn past a film window in response to rotation of the takeup reel. In order to rewind exposed film onto the supply reel, the latter is rotated in a direction to draw the film off the takeup reel. A drawback of conventional magazines of the just outlined character is that they do not have any reliable means for preventing spillage of film when the magazine is accidentally dropped by a clumsy person or while the direction of film travel is being changed from forward to reverse, or vice versa. Presently known devices for preventing spillage of motion picture film in the magazine normally comprise a disk which can engage teeth provided on the reels. It was found that the disk is particularly unreliable (i.e., that it cannot prevent uncontrolled unwinding of film off the supply reel or takeup reel) when the magazine is dropped. Uncontrolled unwinding can cause scratching of the coating on film and other damage.

SUMMARY OF THE INVENTION

One object of our present invention is to provide a magazine for roll film with a very simple, inexpensive but reliable and rugged device which can prevent spillage of film in the interior of the housing, not only while the film transporting mechanism for the camera in which the magazine is used changes the direction of film transport but also when the magazine is accidentally dropped or is subjected to other unanticipated shocks.

Another object of the invention is to provide the magazine with a spillage preventing device which is particularly suited for use in magazines which embody flangeless reels and which can be used to prevent spillage of wider, narrower, longer or shorter roll films.

A further object of the invention is to provide a spillage preventing device which can be readily incorporated in magazines of presently known design with minimal changes in the design of such magazines.

An additional object of the invention is to provide a magazine wherein the two reels are rotatable about a common axis with a spillage preventing device which occupies little room in the housing of the magazine and which does not interfere with the transport of film during normal operation, during rewinding, or when the user of the camera wishes to produce special effects, such as fade-in, fade-out and/or others.

Our invention is embodied in a magazine for roll film, particularly for 8-millimeter motion picture film, which comprises a housing, a pair of preferably (but not necessarily) flangeless coaxial reels rotatably mounted in the housing, a supply of roll film having end portions connected to and intermediate portions convoluted on the reels so that the diameter of the intermediate portion of film on one of the reels decreases when the other reel is rotated in a sense to collect the film and vice versa, and a novel device for preventing spillage of film in the housing, comprising a pair of stop members which preferably resemble U-shaped clamps and are adjacent to the outermost convolutions of film on the two reels and a motion transmitting member which connects the stop members to move one of the stop members toward the axis of the respective reel when the film moves the other stop member away from the axis of the other reel (i.e., in response to increasing diameter of convoluted film on the other reel) or vice versa.

The motion transmitting member may resemble a ring or a portion of a ring and is then mounted between the two reels and is guided by a partition of the housing for movement radially of the common axis of the reels. It is also possible to employ a motion transmitting member which resembles a two-armed lever and is pivotable in the housing about an axis which is parallel to or coincides with the common axis of the reels. Each stop member is then mounted on one arm of the lever.

The novel features which are considered as characteristic of the invention are set forth in particular in the appended claims. The improved magazine itself, however, both as to its construction and the mode of utilizing the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
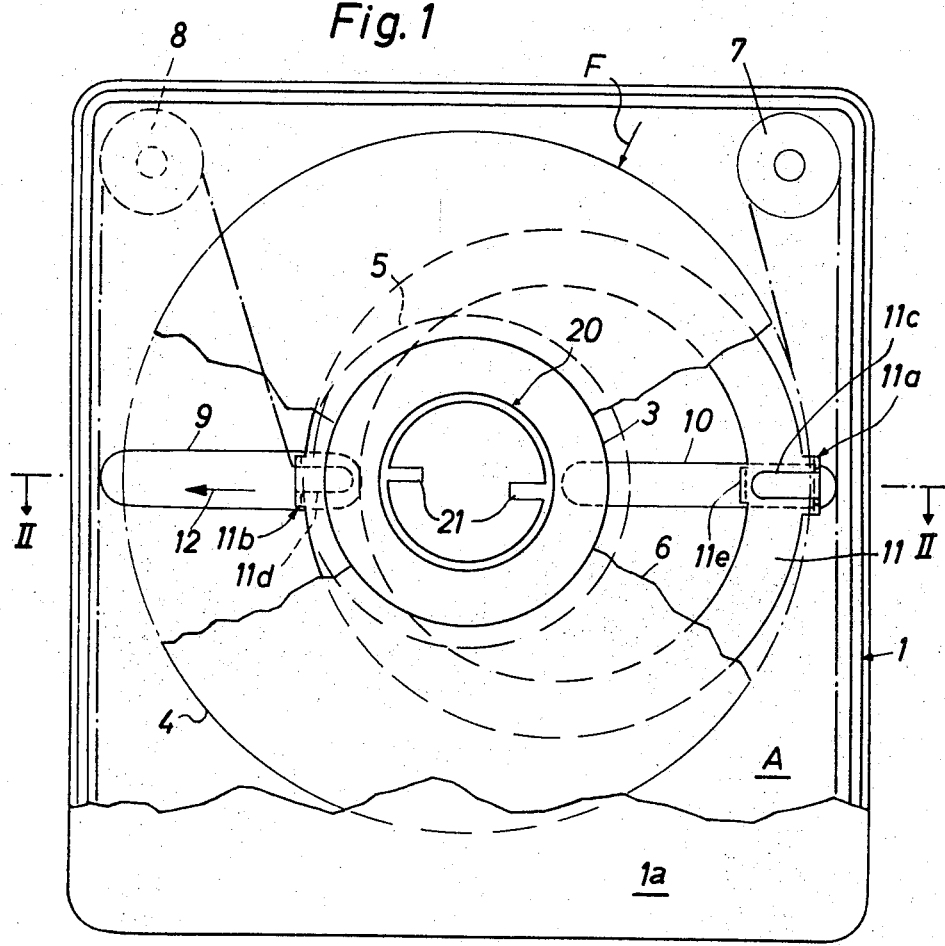
FIG. 1. is a side elevational view of a magazine which embodies one form of our invention, one cover of the housing being partly broken away.
Figure 2:
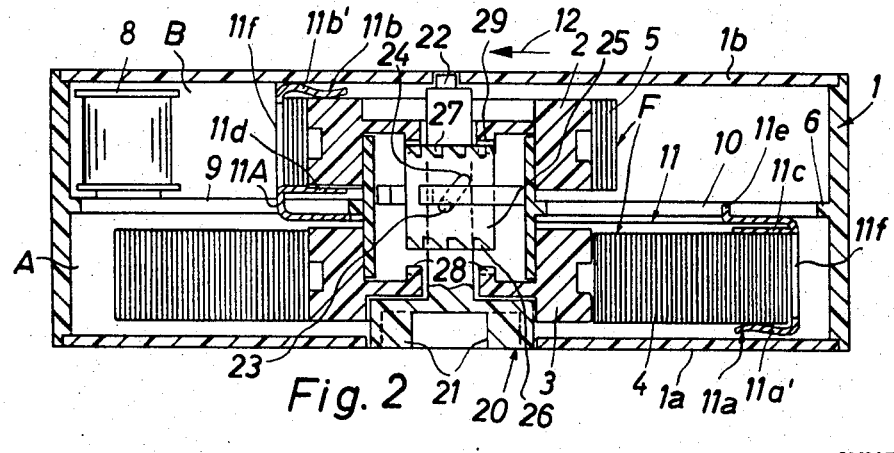
FIG. 2 is a transverse sectional view as seen in the direction of arrows from the line II–II of FIG. 1.

Referring first to FIGS. 1 and 2, there is shown a magazine for motion picture roll film F which comprises a housing 1 having two end walls or covers 1a, 1b and an intermediate wall or partition 6 which divides the interior of the housing into two compartments A and B respectively accommodating a flangeless film supply reel 3 and a flangeless takeup reel 2. The end portions of the film F are connected to the reels 2, 3 in a manner as is customary in magazines for motion picture film and the intermediate portions of film F are convoluted on the reels 2, 3 as respectively shown at 5 and 4. The reels 2, 3 are rotatable about a common axis which is normal to the planes of the covers 1a, 1b. That part of film F which extends between the convoluted intermediate portions 4, 5 is guided by two rollers 7, 8 so that it passes behind a suitable film window (not shown) which is located behind the optical system of a motion picture camera when the magazine is properly inserted into the camera.

The drive means for positively rotating the reel 2 or 3 comprises a driving member 20 having claws 21 which can engage with complementary claws of the output element in a film transporting mechanism of the camera. The driving member 20 is rotatable in the reels 2, 3 and has a stub 22 which is journaled in the cover 1b. A median portion of the driving member 20 carries a radial pin 23 which extends into an oblique slot 24 provided in a sleeve 25 which is axially movable and rotatable within limits on the driving member 20 and has two sets of teeth 26, 27. When the driving member 20 is rotated in a clockwise direction, the pin 23 moves the sleeve 25 downwardly as viewed in FIG. 2, whereby the teeth 26 engage complementary teeth 28 on the reel 3. When the driving member 20 is rotated in a counterclockwise direction, the pin 23 moves the sleeve 25 upwardly, as viewed in FIG. 2, and causes the teeth 27 to engage complementary teeth 29 on the reel 2. The film transporting mechanism of the camera which can receive the magazine is preferably reversible so that the operator can collect the film F on the reel 2 or 3, depending upon whether the camera is operated normally, whether exposed film F is to be rewound on the supply reel 3, or whether the user wishes to produce a special effect, such as fade-in or fade-out.

An important feature of our invention resides in the provision of a novel device which prevents unintentional spillage of film F in the housing 1. Such spillage could occur if one of the reels 2 or 3 would be permitted to rotate in a sense to pay out the film F while the other reel would be held against rotation, or vice versa. For example, the reel 2 could turn in a sense to pay out the intermediate portion 5 of film thereon when the user of the camera would switch from rotation of the reel 2 to rotation of the reel 3 or vice versa. Also, such spillage could take place in response to accidental dropping of the magazine.

The improved spillage preventing device comprises two stop members 11a, 11b which resemble U-shaped clamps and are adjacent to or abut against the outermost convolutions of the intermediate film portions 4 and 5. The device further comprises a motion transmitting carrier 11, here shown as a flat ring, which is mounted in the chamber A and is guided by the partition 6 for reciprocatory movement radially of the common axis of the reels 2 and 3. Thus, the partition 6 constitutes a guide means for the motion transmitting carrier or ring 11 and is provided with two radially extending guide slots 9, 10 which are located diametrically opposite each other. The carrier 11 has a first follower 11A which extends from the chamber A, through the slot 9 and into the chamber B and is rigid with the stop member or clamp 11b. The other stop member or clamp 11a is rigid with the carrier 11 and is located diametrically opposite the stop member 11b with reference to the common axis of the reels 2 and 3. The internal diameter of the carrier 11 is selected in such a way that the carrier can readily move radially of the reels 2, 3 when the diameter of the convoluted intermediate film portion 5 increases at the expense of the convoluted intermediate portion 4, or vice versa. Each stop member is adjacent to the outer side of the respective intermediate film portion 4, 5 and also to both side faces or end faces of such intermediate film portion. The flanges 11c, 11d of the stop members 11a, 11b are optional; they are provided mainly to prevent the adjoining edge faces of convolutions of the film F from rubbing against the partition 6. The distance between the flanges 11c, 11d and 11a', 11b' of the respective stop members 11a, 11b preferably equals or approximates the width of the film F. A second follower 11e of the carrier 11 extends into the radial slot 10 of the partition 6 to thus insure that the carrier cannot wobble during radial movement with reference to the reels 2 and 3.

The distance between the webs 11f of the stop members 11a, 11b preferably exceeds only slightly the diameter of a reel 2 or 3 plus the maximum thickness of film F which can be convoluted on one of the reels. If all or nearly all of the film F is convoluted on the supply reel 3, i.e., if the diameter of the intermediate film portion 4 is at a maximum and the diameter of the intermediate film portion 5 is at a minimum, the carrier 11 is held in a position of maximum eccentricity with reference to the reels 2 and 3. The web 11f of the stop member 11a then engages the outermost convolution of the intermediate film portion 4 but the web 11f of the stop member 11b is slightly spaced from the outermost convolution of the intermediate film portion 5 on the reel 2. This is advisable because the diameter of the film portion 5 increases or decreases more rapidly than the diameter of the film portion 4 when the diameter of the film portion 4 is considerably greater than that of the film portion 5. If the driving member 20 is then rotated in a sense to rotate the reel 2 so that the latter draws film F off the reel 3 and increases the diameter of the intermediate film portion 5, the outermost convolution of the film portion 5 shifts the stop member 11b in the direction indicated by arrow 12 and the carrier 11 entrains the stop member 11a in the same direction. During such travel of film F, the carrier 11 moves radially of the common axis of the reels 2, 3 and is guided by its followers 11A, 11e which respectively slide in the slots 9, 10 of the partition 6. The carrier 11 travels in the direction counter to that indicated by arrow 12 when the driving member 20 rotates the reel 3 in a sense to draw the film off the reel 2. Regardless of whether the driving member 20 rotates the reel 2 or 3, or whether the reels 2, 3 are idle, the stop members 11a, 11b invariably prevent uncontrolled unwinding or spillage of film F in the chamber A or B because they remain closely adjacent to or in direct abutment with the outermost convolutions of film on the respective reels. Such unwinding is prevented when the driving member 20 is temporarily disconnected from its prime mover, when the magazine is withdrawn from the motion picture camera so that the member 20 is not held against rotation in either direction, as well as when a clumsy person happens to drop the magazine during insertion into or withdrawal from the camera.

Figure 3:
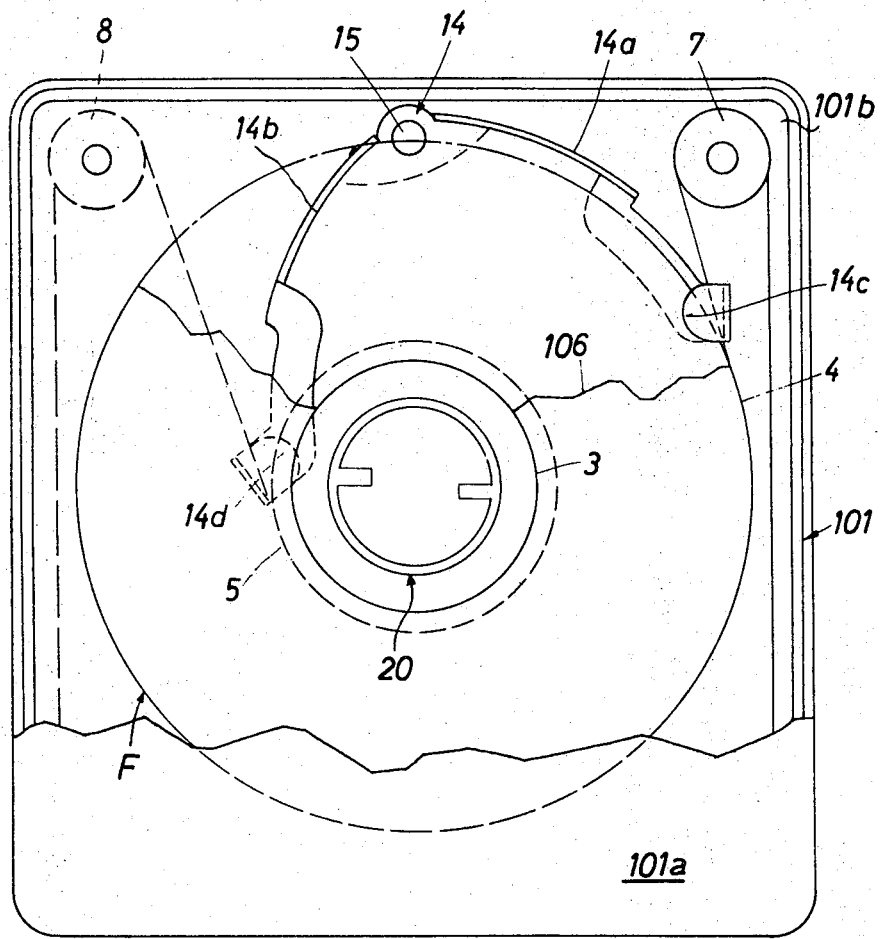
FIG. 3 is a side elevational view of a modified magazine.

FIG. 3 illustrates a second magazine wherein the device which prevents spillage or roll film F comprises two U-shaped stop members or clamps 14c, 14d and a motion transmitting means including a two-armed lever 14 which has two arcuate arms 14a, 14b having the same length and being respectively connected with the stop members 14c, 14d. The housing 101 may but need not be provided with a partition 106. The mounting of the reels (only the reel 3 is shown in FIG. 3) and of the rollers 7, 8 is the same as described in connection with FIGS. 1 and 2. The lever 14 is fulcrumed on a pivot pin 15 which is remote from the common axis of the reels and is mounted in the cover 101a and/or 101b. The principle of operation of the modified spillage preventing device is very similar to that of the previously described device, i.e., the arm 14b of the lever 14 causes the stop member 14d to travel toward the common axis of the reels when the outermost convolution of the intermediate film portion 4 causes the other stop member 14c to move away from the common axis of the reels, or vice versa.

The pivot pin 15 is installed in the housing 101 at a point which is located outwardly of the outermost convolution of the intermediate film portion 4 even when the diameter of this intermediate portion increases to a maximum, i.e., when nearly the entire film F is collected by the reel 3. The curvature of the arms 14a, 14b approximates or equals that of the outermost convolution of film in the intermediate portion 4 when the diameter of the intermediate portion 4 increases to a maximum. The angle enclosed by the arms 14a, 14b is preferably such that the webs of the stop members 14c, 14d respectively abut against the outermost convolutions of intermediate film portions 4, 5 in all angular positions of the lever 14. This insures that the film F cannot spill in either chamber of the housing 101, irrespective of whether the driving member 20 is free to rotate in either direction or whether the magazine is accidentally dropped or otherwise mishandled.

It is clear that the improved magazine is susceptible of many additional modifications without departing from the spirit of our invention. For example, the carrier 11 of FIGS. 1 and 2 need not be a circumferentially complete ring (it can be of semicircular shape or of U-shaped form), and the pivot pin 15 of FIG. 3 could be installed in the space between the convoluted intermediate film portions 4, 5. This latter modification would merely entail a change in the configuration and dimensioning of the arms 14a, 14b. Furthermore, the stop members 11a, 11b of FIGS. 1—2 or the stop members 14c, 14d of FIG. 3 need not resemble U-shaped clamps. Also, such stop members may but need not be at least slightly elastic and they may be made of metal, plastic or other suitable material. Still further, the invention can be embodied in magazines wherein the reels can rotate in a single direction, for example, in a sense to draw film off the supply reel and to convolute it on the takeup reel. Finally, the invention can be embodied in magazines which contain exposed and developed film and are used in or on motion picture projectors.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:
1. A magazine for roll film, comprising a housing; a pair of substantially coaxial reels rotatably mounted in said housing; a supply of roll film having end portions connected to and intermediate portions convoluted on said reels so that the diameter of the intermediate portion on one of the reels decreases when the other reel is rotated to collect the film; and a device for preventing spillage of film in said housing, comprising a pair of stop members adjacent to the outermost convolutions of said intermediate portions and motion transmitting means connecting said stop members to move one of the stop members toward the axis of the one reel only when the other stop member is moved by the film away from the axis of the other reel in response to increasing diameter of the intermediate film portion on the other reel.

2. A magazine as defined in claim 1, wherein said motion transmitting means comprises a carrier disposed between said reels and wherein said stop members are affixed to said carrier and are located substantially diametrically opposite each other with reference to the axes of said reels.

3. A magazine for roll film, comprising a housing; a pair of substantially coaxial reels rotatably mounted in said housing; a supply of roll film having end portions connected to and intermediate portions convoluted on said reels so that the diameter of the intermediate portion on one of the reels decreases when the other reel is rotated to collect the film; and a device for preventing spillage of film in said housing, comprising a pair of stop members adjacent to the outermost convolutions of said intermediate portions and motion transmitting means connecting said stop members to move one of the stop members toward the axis of the one reel when the other stop member is moved by the film away from the axis of the other reel in response to increasing diameter of the intermediate film portion on the other reel, said motion transmitting means comprising a carrier disposed between said reels and said stop members being affixed to said carrier and being located substantially diametrically opposite each other with reference to the axes of said reels, said housing comprising guide means for guiding the carrier for movement substantially radially of said reels.

4. A magazine for roll film, comprising a housing; a pair of substantially coaxial reels rotatably mounted in said housing; a supply of roll film having end portions connected to and intermediate portions convoluted on said reels so that the diameter of the intermediate portion on one of the reels decreases when the other reel is rotated to collect the film; and a device for preventing spillage of film in said housing, comprising a pair of stop members adjacent to the outermost convolutions of said intermediate portions and motion transmitting means connecting said stop members to move one of the stop members toward the axis of the one reel when the other stop member is moved by the film away from the axis of the other reel in response to increasing diameter of the intermediate film portion on the other reel, said motion transmitting means comprising a carrier disposed between said reels and said stop members being affixed to said carrier and being located substantially diametrically opposite each other with reference to the axes of said reels, the distance between said stop members exceeding slightly the diameter of a reel plus the maximum thickness of convoluted intermediate film portion on a reel.

5. A magazine for roll film, comprising a housing; a pair of substantially coaxial reels rotatably mounted in said housing; a supply of roll film having end portions connected to and intermediate portions convoluted on said reels so that the diameter of the intermediate portion on one of the reels decreases when the other reel is rotated to collect the film; and a device for preventing spillage of film in said housing, comprising a pair of stop members adjacent to the outermost convolutions of said intermediate portions and motion transmitting means connecting said stop members to move one of the stop members toward the axis of the one reel when the other stop member is moved by the film away from the axis of the other reel in response to increasing diameter of the intermediate film portion on the other reel, said motion transmitting means comprising a carrier disposed between said reels and said stop members being affixed to said carrier and being located substantially diametrically opposite each other with reference to the axes of said reels, each of said stop members comprising a plurality of mutually inclined portions straddling the outer side and at least one side face of convoluted intermediate film portion on the respective reel.

6. A magazine as defined in claim 5, wherein each of said stop members resembles a U-shaped clamp which straddles the outer side and both side faces of convoluted intermediate film portion on the respective reel.

7. A magazine for roll film, comprising a housing; a pair of substantially coaxial reels rotatably mounted in said housing; a supply of roll film having end portions connected to and intermediate portions convoluted on said reels so that the diameter of the intermediate portion on one of the reels decreases when the other reel is rotated to collect the film; and a device for preventing spillage of film in said housing, comprising a pair of stop members adjacent to the outermost convolutions of said intermediate portions and motion transmitting means connecting said stop members to move one of the stop members toward the axis of the one reel when the other stop member is moved by the film away from the axis of the other reel in response to increasing diameter of the intermediate film portion on the other reel, said motion transmitting means comprising a substantially ring-shaped carrier disposed between said reels and said stop members being provided on said carrier and being located substantially diametrically opposite each other with reference to the axes of said reels, said housing comprising guide means for guiding the carrier for movement substantially radially of said axes, said guide means comprising a partition disposed between said reels adjacent to one side of said carrier and having slot means extending radially of said common axis, said carrier having follower means extending into said slot means.

8. A magazine as defined in claim 7, wherein said follower means connects one of said stop members with said carrier.

9. A magazine as defined in claim 8, wherein said slot means includes a pair of radial slots located diametrically opposite each other with reference to the axes of said reels and said follower means extends through one of said slots, said carrier having second follower means extending into the other slot.

10. A magazine for roll film, comprising a housing; a pair of substantially coaxial reels rotatably mounted in said housing a supply of roll film having end portions connected to and intermediate portions convoluted on said reels so that the diameter of the intermediate portion on one of the reels decreases when the other reel is rotated to collect the film; and a device for preventing spillage of film in said housing, comprising a pair of stop members adjacent to the outermost convolutions of said intermediate portions and motion transmitting means connecting said stop members to move one of the stop members toward the axis of the one reel when the other stop member is moved by the film away from the axis of the other reel in response to increasing diameter of the intermediate film portion on the other reel, said motion transmitting means comprising a two-armed lever fulcrumed in said housing for pivotal movement about a fixed axis and each of said stop members being connected with one arm of said lever.

11. A magazine as defined in claim 10, wherein said fixed axis is remote from the axes of said reels.

12. A magazine as defined in claim 11, wherein the arms of said lever are of arcuate shape and their curvature approximates the outline of the outermost convolution of the intermediate film portion on one of said reels when the diameter of the convoluted intermediate film portion on said last mentioned reel increases to a maximum value.

13. A magazine as defined in claim 10, wherein the angle between the arms of said lever is such that each of said stop members is in permanent abutment with the outer side of the outermost convolution of the intermediate film portion on the respective reel.

14. A magazine for roll film, comprising a housing; a pair of substantially coaxial reels rotatably mounted in said housing; a supply of roll film having end portions connected to and intermediate portions convoluted on said reels so that the diameter of the intermediate portion on one of the reels decreases when the other reel is rotated to collect the film; a device for preventing spillage of film in said housing, comprising a pair of stop members adjacent to the outermost convolutions of said intermediate portions and motion transmitting means connecting said stop members to move one of the stop members toward the axis of the one reel when the other stop member is moved by the film away from the axis of the other reel in response to increasing diameter of the intermediate film portion on the other reel; and drive means rotatably mounted in said housing and arranged to drive one of said reels in response to rotation in a clockwise direction and to drive the other reel in response to rotation in a counterclockwise direction.